US012644862B2

(12) United States Patent (10) Patent No.: US 12,644,862 B2
Geissler et al. (45) Date of Patent: Jun. 2, 2026

(54) DEVICE FOR THE INDUCTIVE DETERMINATION OF THE ELECTRICAL CONDUCTIVITY OF A MEDIUM CONTAINED IN A CONTAINER

(71) Applicant: Endress+Hauser Conducta GmbH+Co. KG, Gerlingen (DE)

(72) Inventors: Sebastian Geissler, Geithain (DE); Robert Lichtenheldt, Leipzig (DE); Ronny Michael, Erlau (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 165 days.

(21) Appl. No.: 18/816,785

(22) Filed: Aug. 27, 2024

(65) Prior Publication Data

US 2025/0076251 A1 Mar. 6, 2025

(30) Foreign Application Priority Data

Sep. 1, 2023 (DE) ..................... 10 2023 123 593.1

(51) Int. Cl.
*G01N 27/74* (2006.01)
(52) U.S. Cl.
CPC ..................................... *G01N 27/74* (2013.01)
(58) Field of Classification Search
CPC ...................................................... G01N 27/74

USPC .............................. 324/500, 600, 76.11, 204
See application file for complete search history.

(56) References Cited

U.S. PATENT DOCUMENTS

| | | | | |
|---|---|---|---|---|
| 4,489,274 A | * | 12/1984 | Berlincourt | .......... G01R 33/022 |
| | | | | 324/257 |
| 11,988,727 B1 | * | 5/2024 | Kubena | .................. H03B 5/366 |
| 2023/0333057 A1 | * | 10/2023 | Xiao | ....................... G01N 27/82 |

FOREIGN PATENT DOCUMENTS

| | | |
|---|---|---|
| DE | 69625777 T2 | 10/2003 |
| DE | 102011002766 A1 | 7/2012 |

* cited by examiner

*Primary Examiner* — Huy Q Phan
*Assistant Examiner* — Trung Q Nguyen
(74) *Attorney, Agent, or Firm* — Mark A. Logan; Endress+Hauser (USA) Holding, Inc.

(57) ABSTRACT

A measuring arrangement for determining the electrical conductivity of a measuring fluid comprises a gradiometer including an excitation coil and a first and a second receiver coil. The first and second receiver coils and the measuring fluid are inductively coupled to the excitation coil. The measuring arrangement includes a measuring circuit for exciting the excitation coil, for detecting an electrical signal from the receiver coils, and for deriving the electrical conductivity of the measuring fluid from the signal. All coils consist of a conductive material that has a resistance temperature coefficient which at 20° C. is less than $3.93*10{-3}$ $K^{-1}$.

11 Claims, 3 Drawing Sheets

DEVICE FOR THE INDUCTIVE DETERMINATION OF THE ELECTRICAL CONDUCTIVITY OF A MEDIUM CONTAINED IN A CONTAINER

CROSS-REFERENCE TO RELATED APPLICATION

The present application is related to and claims the priority benefit of German Patent Application No. 10 2023 123 593.1, filed on Sep. 1, 2023, the entire contents of which are incorporated herein by reference.

TECHNICAL FIELD

The present disclosure relates to a measuring arrangement for determining the electrical conductivity of a measuring fluid.

BACKGROUND

In order to monitor or control industrial processes, it is necessary to measure physical and/or chemical measurement variables of the media contained in the container. In addition to electrical conductivity, the measurement variables to be monitored can, for example, be temperature, pH value, cell density, optical transmission or a concentration of a chemical substance, e.g., a certain type of ion or a certain element, or a certain compound or a biochemical substance—for example, a protein. To ensure and maintain sterility within the process container, it is particularly desirable to measure these measurement variables using non-contact methods.

In process measurement technology or in industrial measurement technology, conductivity sensors that work according to an inductive or conductive measurement principle are often used to measure the conductivity of a fluid.

For example, a conductive conductivity sensor which comprises at least two electrodes immersed in a measuring medium to take measurements is known from EP 990 894 B1. In order to determine the electrical conductivity of the measuring medium, the resistance or conductance of the electrode measuring path in the measuring medium is determined. If the cell constant is known, the conductivity of the measuring medium can then be determined. In order to measure the conductivity of a measuring fluid by means of a conductive conductivity sensor, it is absolutely necessary that at least two electrodes come into contact with the measuring fluid.

Inductive conductivity sensors can be arranged in contact with the medium or without contact with the medium, wherein in both cases an inductive coupling takes place.

The inductive principle of measuring the conductivity of process media assumes the use of sensors that are equipped with both a transmitter coil and at least one receiver coil installed at a distance from the transmitter coil. The transmitter coil produces an alternating electromagnetic field, which affects charged particles, e.g., ions, in the liquid medium and creates a corresponding electric current in the medium. As a result of this electric current, an electromagnetic field appears at the receiver coil, inducing a received signal (induction voltage) on the receiver coil according to Faraday's law of induction. This received signal can be analyzed and used to determine the electrical conductivity of the liquid medium. Typically, inductive conductivity sensors that are in contact with the medium are constructed as follows: The transmitter coil and the at least one receiver coil are, as a rule, built as toroidal coils, enveloping a continuous opening through which the medium can be applied, so that the medium flows around both the coils. The excitation of the transmitter coil creates in the medium a closed current path that passes through both the transmitter coil and the receiver coil. By analyzing the current and voltage signals of the receiver coil in response to the signal from the transmitter coil, the conductivity of the measuring fluid can be determined. This principle is well established in industrial process measurement equipment, and has been documented in a large number of texts and patent literature—for example, in DE 198 51 146 A1, DE 197 47 273 B4, DE 3718 111 C2, or DE 199 48 465 A1.

Copper is used as the coil material due to its excellent electrical conductivity. The disadvantage of copper, however, is that its conductivity is very dependent upon temperature. The resistance temperature coefficient of copper is $3.93*10{-}3$ K$-1$. Thus, when using copper as a coil material, temperature compensation is required when measuring the electrical conductivity of a fluid in the event of temperature fluctuations or when measuring over a wide range of temperature changes—for example, over a temperature difference of 30° C., 50° C., 60° C., 70° C., 80° C., 90° C., 100° C., or up to 200° C.

SUMMARY

The object of the present disclosure is therefore to overcome the disadvantages of the prior art. In particular, a device and a method for measuring the conductivity of a measuring fluid are to be specified, which is suitable for applications in process measurement technology, which take place over a wide temperature range of the fluid to be measured, e.g., up to 200° C., preferably from over 0° C. to 200° C., more preferably up to 100° C., even more preferably from over 0° C. to 100° C., wherein a high measurement accuracy is available in a wide temperature range.

This object is achieved by a measuring arrangement for determining the electrical conductivity of a measuring fluid, preferably an electrically conductive fluid, comprising:

(i) a gradiometer comprising
  an excitation coil, wherein the excitation coil is configured as a transmitter coil, and
  a first receiver coil and a second receiver coil, wherein the first and second receiver coils and the measuring fluid are inductively coupled to the excitation coil, (ii) a measuring circuit which is configured to excite the excitation coil to generate an alternating field passing through the receiver coils and the measuring fluid and to detect an electrical signal from the receiver coils and to derive the electrical conductivity of the measuring fluid from the signal,
wherein
the alternating field generated in the excitation coil induces a ring-shaped alternating current and thereby a magnetic field which runs in the first and second receiver coils and in the liquid medium, wherein an alternating electrical current and thus a magnetic field is induced in the measuring fluid, wherein the first receiver coil is more strongly penetrated by the magnetic field of the measuring fluid than the second receiver coil, wherein preferably the second receiver coil is not penetrated by the magnetic field induced in the measuring fluid, (iii) a container in which the measuring fluid is contained, wherein the gradiometer is at least partially connected to a wall of the container or is arranged adjacent to the container wall, wherein the container consists of electrically non-conductive material at least in the region of the gradiometer, in particular in the region of the induced magnetic fields, characterized in that the excitation coil and the first and the second receiver coils consist of a conductive material that has a resistance temperature coefficient which at 20° C. is less than $3.93*10-3$ K–1, preferably less than $0.1*10^{-3}$ $K^{-1}$, more preferably less than $0.05*10^{-3}$ $K^{-1}$.

The measuring arrangement according to the present disclosure is configured to measure the conductivity of a measuring fluid both in a contact-based manner, i.e., by at least one, preferably both, receiver coils touching the fluid to be measured, and in a contact-free manner with respect to the fluid to be measured. The measuring arrangement according to the present disclosure enables stable conductivity measurement over a wide temperature range. This is achieved by the coil material used in the excitation coil and the receiver coils, the conductivity of which remains stable up to temperatures of 200° C., preferably up to temperatures of 100° C.

In one embodiment, the measuring arrangement is configured to measure measuring fluids at temperatures up to 200° C. without a temperature sensor being arranged on the first and second receiver coils and without a controller connected to the temperature sensors for compensating for changes in resistance at the first and/or the first receiver coil caused by a rise in temperature.

In one embodiment, the conductive material consists of an alloy, preferably a copper-containing alloy.

In one embodiment, the alloy contains 50-60 wt. % copper, 38-48 wt. % nickel, and 1-5 wt. % manganese, preferably 53-57 wt. % copper, 43-45 wt. % nickel, and 0.5-1.2 wt. % manganese, further preferably 55% copper, 44% nickel, and 1% manganese or 82-84 wt. % copper, 12-15 wt. % manganese, and 2-4 wt. % nickel.

In one embodiment, the excitation coil, the first receiver coil, and the second receiver coil are wound as cylinder coils around a coil former which consists of an electrically non-conductive material, more preferably an electrically non-conductive plastic or an electrically non-conductive ceramic, or applied as laminated conductor tracks or as a thin wire on milled cavities of a component of planar structure made of electrically non-conductive material, in particular on a printed circuit board or on a ceramic substrate.

In one embodiment, the first and second receiver coils are arranged symmetrically relative to the excitation coil and connected in series or parallel.

In one embodiment, the excitation coil, the first receiver coil, and the second receiver coil are arranged coaxial to each other, side by side in one plane, at an angle, wherein the central axes of the two coils preferably intersect, e.g., by forming an angle of 90°, or the excitation coil and the receiver coils are arranged on two levels one above the other, wherein the excitation coil is arranged on a level facing away from the measuring fluid compared to the level of the receiver coils, wherein the receiver coils are arranged symmetrically with respect to the central axis of the excitation coil.

In one embodiment, the transmitter coil and the first and second receiver coils are arranged coaxially in the cylinder coils: They have a common longitudinal axis along which the three coils are arranged, wherein the first and second receiver coils are arranged symmetrically, preferably mirror-symmetrically, to the transmitter coil and are thus at the same distance from the transmitter coil.

In one embodiment of the arrangement in a plane or a planar arrangement, the first and the second receiver coils are equally spaced from the transmitter coil, wherein the transmitter coil and the first and the second receiver coils are arranged in one plane.

In an alternative embodiment, the first and second receiver coils as well as the transmitter coil are each planar, wherein the first and second receiver coils are arranged symmetrically and equally spaced from the first coil. In a preferred embodiment, the three coils are arranged coaxially.

In one embodiment, the first and second receiver coils have the same geometry, the same number of turns, and the same line cross-section of the electrical conductor forming the turns.

In one embodiment, the gradiometer containing the excitation coil and the first and the second receiver coils is located outside the container.

In one embodiment, the gradiometer is built into the container wall, and/or the gradiometer is at least partially located inside the container, wherein the first receiver coil is surrounded by the measuring fluid, the excitation coil is arranged in the container wall, and the second receiver coil is located outside the container, the first and second receiver coils are surrounded by the measuring fluid, and the excitation coil is arranged in the container wall or is located outside the container, or the first and second receiver coils and the excitation coil are surrounded by the measuring fluid, wherein the second receiver coil surrounded by the measuring fluid is electrically insulated from the measuring fluid by an insulation coating, preferably in that the second receiver coil is encased in a cap, a tube, a cylinder, or a layer of polyether ether ketone (PEEK) or fluororubber (FKM) or ethylene propylene diene rubber (EPDM).

The gradiometer is connected to the container by screwing, gluing, or locking, for example. There are embodiments in which the gradiometer is connected to the container by a pipe socket with a flange arrangement. In one embodiment, the gradiometer can also be part of a fitting, such as a retractable fitting. In embodiments in which at least part of the gradiometer is in contact with the measuring fluid, the gradiometer is arranged in a container opening.

In all embodiments, the gradiometer is arranged or installed in an electrically non-conductive region of the container wall. The electrically non-conductive region can, for example, be part of a process connection or flange and can be made of PEEK (polyether ether ketone). The electrically non-conductive region can also be a sealing ring and can be made of FKM (fluororubber) or EPDM (ethylene propylene diene rubber).

In one embodiment, the first receiver coil, the second receiver coil, and/or the excitation coil are protected from the medium by a gas- and liquid-tight protective device or a protective layer in front of the medium. Preferably, this is structured as a cap, protective tube, or protective cylinder, wherein the protective device preferably consists of or comprises a liquid-tight, chemically inert, sterilizable material with a temperature stability of up to over 200° C. Preferably, the material comprises or consists of polyether ether ketone (PEEK).

The present disclosure also relates to a method for determining the electrical conductivity of a measuring fluid, comprising the steps of:

(i) providing a measuring arrangement according to the present disclosure or an embodiment thereof, (ii) exciting the excitation coil to generate an alternating magnetic field which passes symmetrically through the first receiver coil and the second receiver coil and induces a magnetic field in the measuring fluid which is directed opposite to the alternating magnetic field, wherein the receiver coils are exposed at different intensities to the magnetic field which is induced by the alternating magnetic field in the measuring fluid and which is directed opposite to the alternating magnetic field;

(iii) detecting an electrical signal of the receiver coils, in particular a difference between a first electrical signal induced in the first receiver coil and an electrical signal induced in the second receiver coil, and (iv) determining the electrical conductivity of the measuring fluid based upon the electrical signals detected by the receiver coils.

The transmitter coil, the first receiver coil, and the second receiver coil are electrically connected to the measuring circuit. The measuring circuit generates and controls in open-loop and/or closed-loop fashion a current, in particular an alternating current, which is sent through the transmitter coil. This induces a magnetic field in the transmitter coil. The measuring circuit is, for example, a circuit for generating and measuring current as well as a connected microcontroller. The individual components of the measuring circuit, such as microcontroller, current generator, and current meter, form a unit, for example.

In all embodiments, the induced voltages in the first and second receiver coils are further processed in the measuring circuit. The electrical conductivity of the medium is determined by evaluating the current or voltage signal of the first and second receiver coils in response to the signal of the transmitter coil.

If the medium in the container and the medium outside the container have the same electrical properties, subtracting the voltages results in a value of 0 V if the first and second receiver coils are wound in opposite directions and have the same characteristics such as diameter, number of turns, pitch, and number of winding layers.

Preferably, the first and second receiver coils are electrically connected to each other in parallel or in series. In one embodiment, the first and second receiver coils are made from a single piece of conductor. In such an embodiment, the coils are electrically connected in series, but form two, physically separate, winding portions.

In one embodiment, the first receiver coil and the second receiver coil are wound in opposite directions. This eliminates any subtraction, since voltages with different signs are induced in the first and second receiver coils. The voltages can be added with little circuit effort.

All the modular systems and the measuring systems described above can be combined with each other in each case, provided that this is technically possible.

BRIEF DESCRIPTION OF THE DRAWINGS

The present disclosure is explained in more detail in the following description with reference to the exemplary embodiments shown in the drawing.

In the figures.

DETAILED DESCRIPTION

Figure 1:
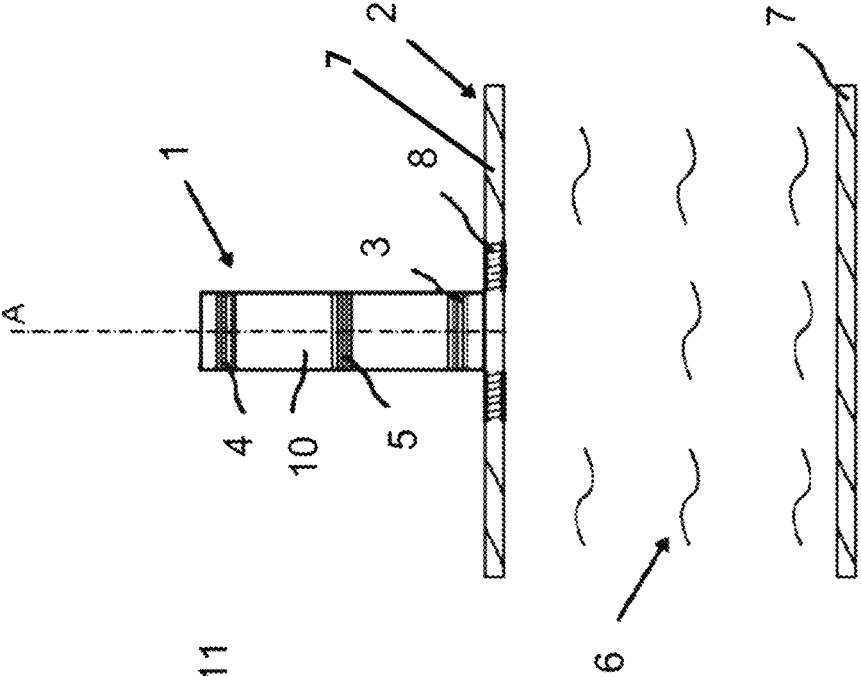
FIG. 1 shows in cross-section a first embodiment of a gradiometer according to the present disclosure.
Figure 2:
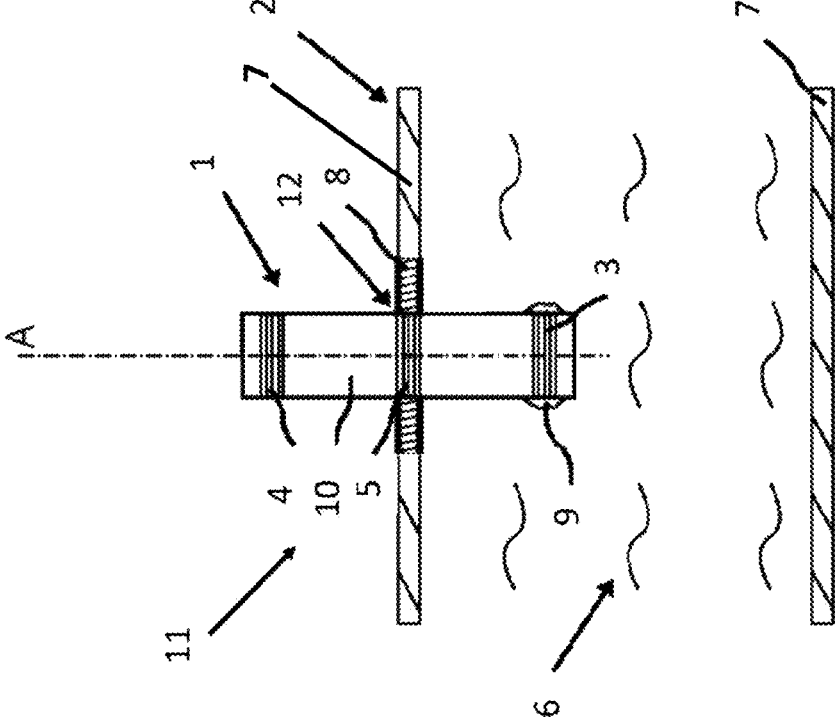
FIG. 2 shows in cross-section a second embodiment of a gradiometer according to the present disclosure.
Figure 3:
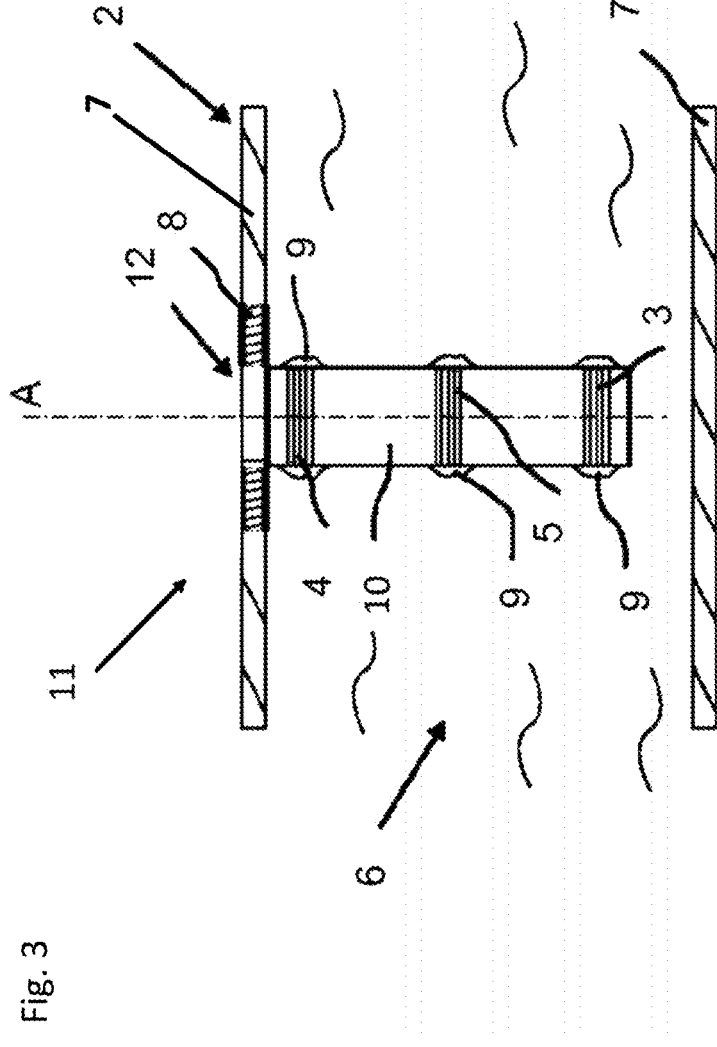
FIG. 3 shows in cross-section a third embodiment of a gradiometer according to the present disclosure.

FIGS. 1 to 3 show the cross-section of a gradiometer 1 according to the present disclosure in three arrangements of the gradiometer 1 relative to the container 2. In all three arrangements, the first receiver coil 3 and the second receiver coil 4 are arranged mirror-symmetrically to the transmitter coil 5. In FIG. 1, all three coils are arranged outside the container 2. In FIG. 2, the first receiver coil 3 is located inside the container, the transmitter coil 5 is located in the container wall, and the second receiver coil 4 is located outside the container. In FIG. 3, all three coils 3, 4, 5 are arranged inside the container 2. In FIG. 3, the gradiometer 1 is configured such that the first receiver coil 3 and the second receiver coil 4 are unequally penetrated by the induced magnetic field through the electrically conductive medium 6. For example, the second receiver coil is electrically insulated. In a preferred embodiment, all coils 3, 4, 5 are arranged outside the container.

In embodiments in which at least a part of the gradiometer 1 is in contact with the measuring fluid 2 or the medium in the container 6, the gradiometer is arranged in a container opening 12.

In the following, the principle of the present disclosure will be explained again in general terms:

The excitation coil/transmitter coil/first inductor 5 is excited by an alternating current. The resulting magnetic field flows through the medium and causes an eddy current. It also flows through a first receiver coil and a second receiver coil or the second and third inductors 3, 4, which have the same inductive coupling to the excitation coil/transmitter coil/first inductor 5. This means that they have the same spacing and number of turns and other similarly relevant parameters for inductance. This ensures that the exciting magnetic field creates an equal magnetic flux in these two inductors 3, 4. However, the first and second receiver coils or inductors 3, 4 have a different inductive coupling to the medium 2, so that the secondary magnetic field generated by the eddy current causes different magnetic fluxes in the first and second receiver coils or the second and third inductors 3, 4.

If the first and second receiver coils or the second and third inductors 3, 4 are connected in series, the same current flows in both, but different voltages are induced, and a differential voltage can be measured at the connection terminals on the measuring circuit. If the first and second receiver coils or the second and third inductors 3, 4 are connected in parallel, the same voltage, but different currents are induced in both. The voltages or currents caused by the induced magnetic field just cancel each other out, the voltages or currents caused by the secondary magnetic field are unequal in size because they are influenced by the measuring fluid or medium, and the evaluation of this difference allows conclusions to be drawn about the conductivity of the medium to be measured.

What is crucial is that the inductive coupling from the excitation coil/transmitter coil 5 to the first receiver coil/second inductor 3 be equal to the inductive coupling from the excitation coil/transmitter coil 5 to the second receiver coil/third inductor 4, so that the first receiver coil/second inductor and the second receiver coil/third inductor 3, 4 are subject to the same magnetic flux by the primary magnetic field. It is also crucial that the first receiver coil/second inductor 3 and the third receiver coil/third inductor 4 be subject to an unequal magnetic flux by the secondary magnetic field.

The coils 3, 4, 5 are electrically connected to a measuring circuit. The measuring circuit generates and controls in open-loop and/or closed-loop fashion a current, in particular an alternating current, which is sent through the transmitter coil 5. This induces a magnetic field in the transmitter coil 5. The measuring circuit is, for example, a circuit for generating and measuring current as well as a connected microcontroller. In one embodiment, the individual components of the measuring circuit, such as microcontroller, current generator, and current meter, are arranged in one component.

The electromagnetic waves couple via the holding device 10 as well as via the media 6, 11 inside and outside the container 2. According to Faraday's law of induction, a voltage is then induced in the first and second receiver coils, and a current flows in the coils.

Due to the different electrical properties of the media 6, 11 inside and outside the container 2, a different voltage or current is induced in the first receiver coil/second inductor than in the second receiver coil/third inductor. For example, the first receiver coil is more strongly penetrated by the secondary magnetic field than the second receiver coil.

The induced voltages in the first and second receiver coils are further processed in the measuring circuit. The electrical conductivity of the medium 2 can be determined by evaluating the current or voltage signal of the first and second receiver coils in response to the signal of the transmitter coil 5.

If the medium 6 in the container 2 and the medium 11 outside the container 8 have the same electrical properties, subtracting the voltages results in a value of 0 V if the first and second receiver coils are wound in opposite directions and have the same characteristics such as diameter, number of turns, pitch, and number of winding layers.

The first and second receiver coils 3, 4 or the second and third inductors 3, 4 can also be electrically connected to one another. This makes serial or parallel connection possible. The first and second receiver coils 3, 4 can be made from a single piece of conductor. The coils are then electrically connected in series, but form two, physically separate winding portions. The second and third receiver coils 3, 4 or the second and third inductors 3, 4 can also be wound in opposite directions. This eliminates the need for any subtraction, since voltages with different signs are induced, and the voltages can be added with little circuit effort.

The transmitter coil as well as the first and second receiver coils consist of a conductive material that has a resistance temperature coefficient which at 20° C. is less than 3.93*10−3 K−1, preferably less than 0.1*10−3 K−1, more preferably less than 0.05*10−3 K−1. For example, the alloy contains: 50-60 wt. % copper, 38-48 wt. % nickel, and 1-5 wt. % manganese, preferably; 53-57 wt. % copper, 43-45 wt. % nickel, and 0.5-1.2 wt. % manganese, further preferably:

55% copper, 44% nickel, and 1% manganese; or 82-84 wt./copper, 12-15 wt./manganese, and 2-4 wt. % nickel.

The invention claimed is:

1. A measuring arrangement for determining an electrical conductivity of a measuring fluid, comprising:
   a gradiometer, including:
      an excitation coil, wherein the excitation coil is configured as a transmitter coil;
      a first receiver coil; and
      a second receiver coil,
      wherein the first and second receiver coils and the measuring fluid are inductively coupled to the excitation coil;
   a measuring circuit that is configured to excite the excitation coil to generate an alternating field passing through the receiver coils and the measuring fluid and to detect an electrical signal from the receiver coils and to derive the electrical conductivity of the measuring fluid from the signal, wherein the alternating field generated in the excitation coil induces a ring-shaped alternating current and thereby a magnetic field which runs in the first and second receiver coils and in the liquid medium, wherein an alternating electrical current and thus a magnetic field is induced in the measuring fluid, wherein the first receiver coil is more strongly penetrated by the magnetic field of the measuring fluid than the second receiver coil, wherein preferably the second receiver coil is not penetrated by the magnetic field induced in the measuring fluid; and
   a container in which the measuring fluid is contained, wherein the gradiometer is at least partially connected to a wall of the container or is arranged adjacent to the container wall, wherein the container consists of electrically non-conductive material at least in the region of the gradiometer,
   wherein the excitation coil and the first and the second receiver coils are embodied of a conductive material that has a resistance temperature coefficient which at 20° C. is less than 3.93*10−3 K−1.

2. The measuring arrangement according to claim 1, wherein the measuring arrangement is configured to measure measuring fluids at temperatures up to 200° C. without a temperature sensor being arranged on the first and second receiver coils and without a controller connected to the temperature sensors for compensating for changes in resistance at the first and/or the first receiver coil caused by a rise in temperature.

3. The measuring arrangement according to claim 1, wherein the conductive material includes an alloy.

4. The measuring arrangement according to claim 3, wherein the alloy contains: 50-60 wt. % copper, 38-48 wt. % nickel, and 1-5 wt. % manganese; 53-57 wt. % copper, 43-45 wt. % nickel, and 0.5-1.2 wt. % manganese; 55% copper, 44% nickel, and 1% manganese; or 82-84 wt. % copper, 12-15 wt. % manganese, and 2-4 wt. % nickel.

5. The measuring arrangement according to claim 1, wherein the excitation coil, the first receiver coil, and the second receiver coil are wound as cylinder coils around a coil former having a component of planar structure formed of electrically non-conductive material or are applied as laminated conductor tracks or as a thin wire on milled cavities of a planar, electrically non-conductive material.

6. The measuring arrangement according to claim 1, wherein the first and second receiver coils are arranged symmetrically relative to the excitation coil and are connected in series or parallel.

7. The measuring arrangement according to claim 1, wherein the excitation coil, the first receiver coil, and the second receiver coil are arranged coaxial to each other, side by side in one plane, at an angle, wherein the central axes of the two coils intersect, or wherein the excitation coil and the receiver coils are arranged on two levels one above the other, wherein the excitation coil is arranged on a level facing away from the measuring fluid compared to the level of the receiver coils, wherein the receiver coils are arranged symmetrically with respect to the central axis of the excitation coil.

8. The measuring arrangement according to claim 1, wherein the first and second receiver coils have a same geometry, a same number of turns, and a same line cross-section of the electrical conductor forming the turns.

9. The measuring arrangement according to claim 1, wherein:

the gradiometer is located outside the container, or the gradiometer is built into the container wall, and/or the gradiometer is at least partially located inside the container, wherein the first receiver coil is surrounded by the measuring fluid, the excitation coil is arranged in the container wall, and the second receiver coil is located outside the container, the first and second receiver coils are surrounded by the measuring fluid, and the excitation coil is arranged in the container wall or is located outside the container, or the first and second receiver coils and the excitation coil are surrounded by the measuring fluid, wherein the second receiver coil surrounded by the measuring fluid is electrically insulated from the measuring fluid by an insulation coating.

10. The measuring arrangement according to claim 9, wherein the first receiver coil, the second receiver coil, and/or the excitation coil are protected from the medium by a gas- and liquid-tight protective layer or protective device.

11. A method for determining the electrical conductivity of a measuring fluid, comprising:

providing a measuring arrangement, including:

a gradiometer, including:

an excitation coil, wherein the excitation coil is configured as a transmitter coil;

a first receiver coil; and a second receiver coil, wherein the first and second receiver coils and the measuring fluid are inductively coupled to the excitation coil;

a measuring circuit that is configured to excite the excitation coil to generate an alternating field passing through the receiver coils and the measuring fluid and to detect an electrical signal from the receiver coils and to derive the electrical conductivity of the measuring fluid from the signal, wherein the alternating field generated in the excitation coil induces a ring-shaped alternating current and thereby a magnetic field which runs in the first and second receiver coils and in the liquid medium, wherein an alternating electrical current and thus a magnetic field is induced in the measuring fluid, wherein the first receiver coil is more strongly penetrated by the magnetic field of the measuring fluid than the second receiver coil, wherein preferably the second receiver coil is not penetrated by the magnetic field induced in the measuring fluid; and a container in which the measuring fluid is contained, wherein the gradiometer is at least partially connected to a wall of the container or is arranged adjacent to the container wall, wherein the container consists of electrically non-conductive material at least in the region of the gradiometer, wherein the excitation coil and the first and the second receiver coils are embodied of a conductive material that has a resistance temperature coefficient which at $20°$ C. is less than $3.93*10-3$ $K^{-1}$;

exciting the excitation coil to generate an alternating magnetic field which passes symmetrically through the first receiver coil and the second receiver coil and induces a magnetic field in the measuring fluid which is directed opposite to the alternating magnetic field, wherein the receiver coils are exposed at different intensities to the magnetic field which is induced by the alternating magnetic field in the measuring fluid and which is directed opposite to the alternating magnetic field;

detecting an electrical signal of the receiver coils; and determining the electrical conductivity of the measuring fluid based upon the electrical signals detected by the receiver coils.

* * * * *